Nov. 21, 1939.   H. H. BALL   2,180,947
AUTOMATIC WASHING MACHINE
Filed Aug. 10, 1938   2 Sheets-Sheet 1

INVENTOR
Harold H. Ball
BY
Kenyon & Kenyon
ATTORNEYS

UNITED STATES PATENT OFFICE 2,180,947

AUTOMATIC WASHING MACHINE

Harold H. Ball, New Brunswick, N. J., assignor to Industrial Washing Machine Corporation, New Brunswick, N. J., a corporation of New Jersey Application August 10, 1938, Serial No. 224,033

13 Claims. (Cl. 141—1)

This invention relates to automatic washing machines and more especially to machines for washing baking or cooking pans and the like.

An object of this invention is a machine of compact size with which a single operator may efficiently and thoroughly clean and dry a large number of pans in a short space of time.

In a machine embodying the invention, a soaking tank is provided through which the pans are passed and subjected to the action of a chemical solution capable of releasing the accumulated material on the pans. The pans are passed through such solution in inverted position and means are provided for excluding all air from the pans during the soaking operation. After the pans have been thoroughly soaked, they are rinsed with clear water in a chamber directly above the soaking tank and are then dried by the action of hot air in a drying chamber above the rinsing chamber, after which they are returned to the place of insertion. The pans are carried through the various stages by suitable conveyor means so arranged that a single operator may both place the dirty pans in the conveyor means and remove the clean, dried pans from the conveyor at the same station.

Other objects, novel features and advantages of this invention will become apparent from the following specification and accompanying drawings, wherein.

Figure 1:
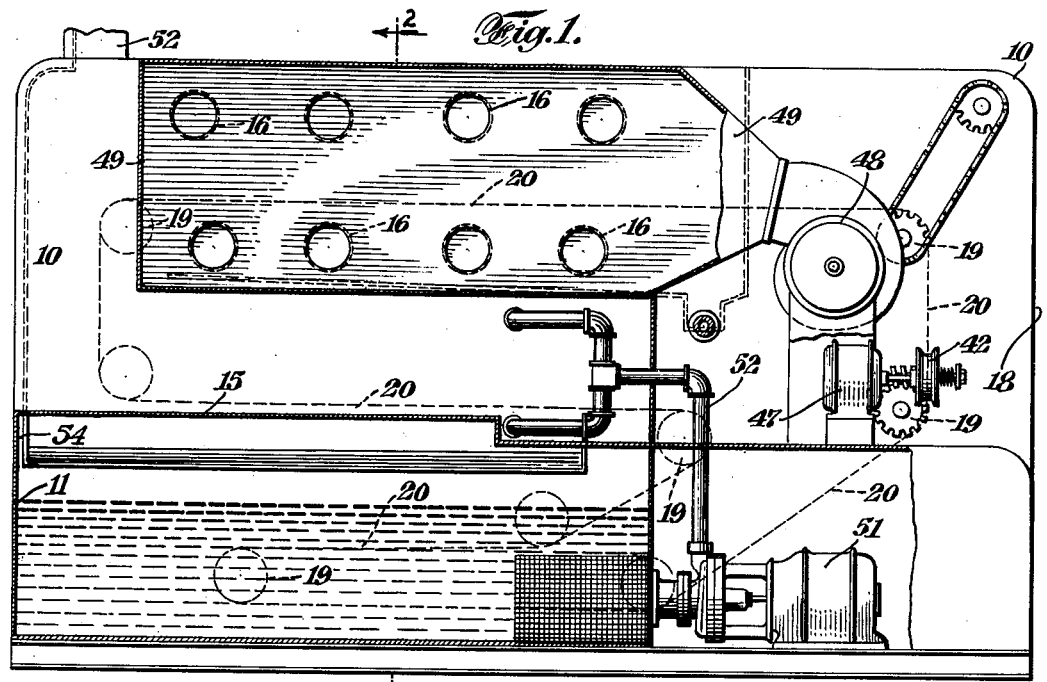
Fig. 1 is a side elevation partially broken away of a washing machine embodying the invention.
Figures 2, 3:
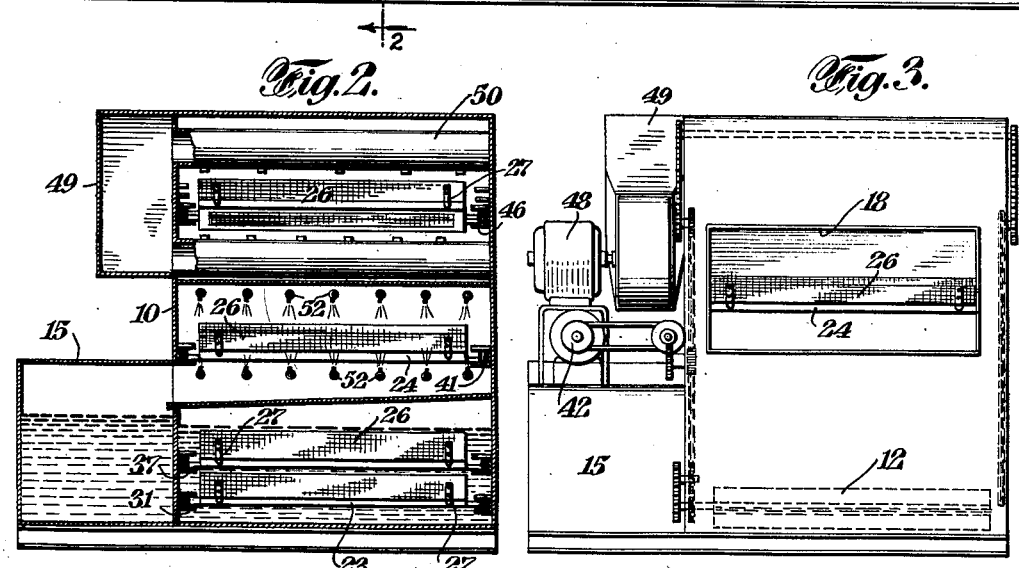
Fig. 2 is a section on the line 2—2 of Fig. 1.
Fig. 3 is a right end view of Fig. 1.
Figures 4, 5:
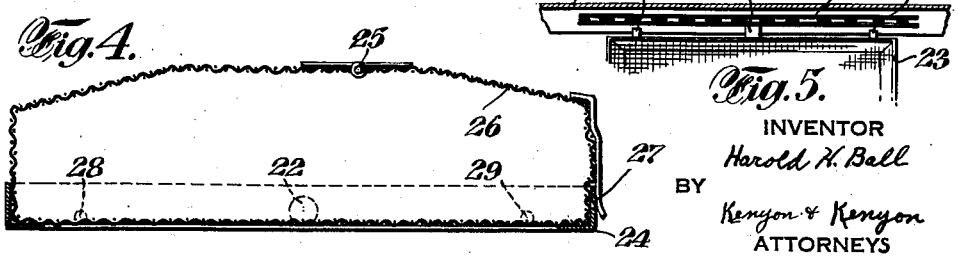
Fig. 4 is a sectional view of a basket for transporting a plurality of pans through the machine.
Fig. 5 is a fragmentary view of the means for conveying the basket through the machine.

In the lower part of the casing 10 is provided a tank 11 in one end of which is provided an agitator 12. Above the tank are provided two sets of water sprays 13 and a sloping partition 14 is provided between the sprays and the tank, the partition leading into a second tank 15 exterior of the casing 10. Above the water sprays 13 are provided two further sets of hot air sprays 16 which are separated from the water sprays 13 by a partial partition 17. At one end of the casing is provided an aperture 18 through which pans to be washed and washed pans are introduced and removed from the machine.

Each side wall of the casing rotatably supports a plurality of sprockets 19 with which is engaged an endless link chain 20 of a conveyor which leads from the aperture 18 in a slanting direction to the bottom the tank 11 near one end thereof and then continues nearly to the other end of the tank where it is turned back to have a second portion lying in the tank 11. From the tank 11, the conveyor extends upwardly and then turns back to extend over the partition 14 between the water sprays 13. At the left-hand end of the casing, the conveyor rises vertically and then again turns into a horizontal position to pass between the hot air sprays 16 and back to the right-hand end of the casing where it again turns downwardly to complete its cycle. At intervals throughout the length of the chains 20 are connected pins 22 which are also pivotally connected to baskets 23 whereby motion of the conveyor causes a basket to move successively through the soaking tank, rinsing chamber, drying chamber and back to the aperture 18. Each basket consists of a wire mesh or the like suitably reinforced by frame 24 and a portion of each basket is hinged at 25 to provide a cover 26 which may be lifted to insert and remove pans. The cover 26 is provided with suitable latch means 27 for holding the cover in closed position during movement of the baskets through the apparatus.

Figure 6:
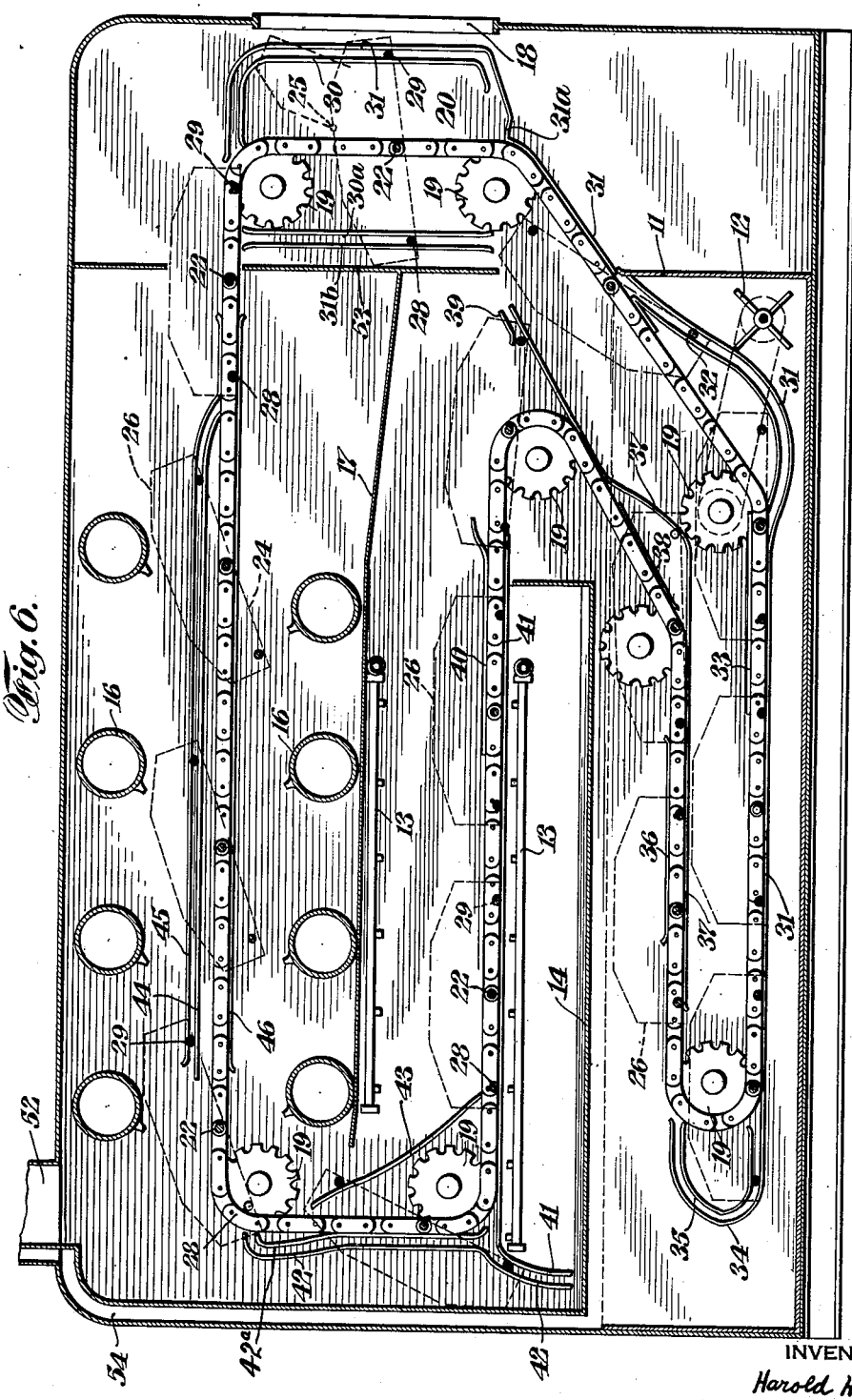
Fig. 6 is an enlarged longitudinal section through the machine.

Each basket is provided with a pair of pins 28 and 29 which in co-operation with suitable guide members on the casing walls cause the basket to assume certain desired relations to the conveyor at different places in the apparatus for the purpose of facilitating the soaking, rinsing and drying operations. Two guide members 30 and 31 extend vertically across the opening 18 and at their upper ends extend inwardly horizontally with the guide member 30 terminating a trifle short of the guide member 31. The bottom end of the guide member 31 slants downwardly away from the opening 18 to approximately the path of the conveyor where it has a slight upward hump 31a and then continues downwardly in line with the conveyor until it reaches the edge of the tank 11 where it takes a sharper slant and then continues along a curve to the path of the conveyor where it becomes horizontal and extends along the tank. The lower end of the guide member 30 parallels the guide member 31 over a short distance but terminates short of the hump 31a. A guide member 32 parallels the sharply slanting and curved portions of the guide member 31. Guide members 30a and 31a parallel members 30 and 31. As indicated in Fig. 6, the conveyor carries the baskets across the opening 18 with the pins 28 and 29 sliding between the guides 30a and 31a and 30 and 31 respectively. When the pin 22 reaches the beginning of the inclined portion of the conveyor path, the bottom of the basket is substantially parallel to the conveyor chain and proceeds in such position until the pin 29 engages the hump 31a whereupon the basket is tilted to locate the pin 28 between the guides 31 and 32, thus causing the basket to enter the tank in nearly vertical position for the purpose of releasing air trapped in the pans contained in the basket, such pans being in inverted position. The pin 28 follows between the guides 31 and 32 until it reaches the end of guide 32, whereupon it engages the horizontal guide member 33 to rotate the basket back into substantial alinement with the direction of conveyor travel. As the basket reaches the left-hand end of the tank, the pin 28 passes between curved guides 34 and 35, which maintain the basket in horizontal position while it is lifted by the conveyor to the level of the return path. Horizontal guides 36 and 37 form a channel to receive the pins 28 and 29 and retain the basket in horizontal position during its return travel through the soaking tank. The guide member 37 continues considerably beyond the guide member 36 and eventually turns upwardly at a sharp angle and then eases off into alinement with the slanting portion of the conveyor path. The pin 29 follows along the guide member 37 while the pin 22 engages the guide 38, thereby delaying tilting motion of the basket until it begins its upward movement. At the extreme end of the guide member 37 is provided a short guide member 39 and the pin 29 passes between said two guide members while the pin 22 is passed around the sprocket to bring the basket into substantially horizontal position. The basket is brought completely into horizontal position by passage of the pin 28 between horizontal guide members 40 and 41 on movement of the basket to the left between the water sprays 13. The guide member 40 is relatively short but the guide member 41 extends substantially the full length of the rinsing chamber and is turned downwardly at its left-hand end. The single guide member serves to hold the basket in horizontal position by reason of the engagement therewith of all three pins. A vertical guide member 42, adjacent the left-hand end of the casing has a lower curved portion conforming to the curved portion of the guide member 41 and the pin 28 passes between the two curved portions while the pin 22 passes around the sprocket, thereby bringing the basket into the substantially vertical position shown. The pin 29 engages the guide member 43 from which it is released upon the assumption of a vertical position by the basket. As the basket moves upwardly from the rinsing chamber to the drying chamber, the pin 28 retraces its path between the curved portions of guide members 41 and 42 and passes upwardly between the guide member 42 and a second vertical guide member 42a. The upper ends of guide members 42 and 42a are appropriately curved to guide the basket as the pin 22 passes around the sprocket in such a way as to cause the pin 29 to pass between horizontal guide members 44 and 45 which, in co-operation with the horizontal guide member 46 engaged by the pin 22, causes the basket to travel through the drying chamber in the oblique position shown. Near the right-hand end of the chamber, the guides 44 and 45 curve downwardly and the guide member 44 terminates while the guide member 45 continues parallel with the guide member 46 to hold the basket in horizontal position until the pin 29 passes between the upper ends of the tracks 30 and 31 preparatory to descending across the opening 18.

The baskets are held under complete control throughout their entire passage through the casing by the interaction of the pins 28 and 29 with the various guide members described. As the basket enters the tank, it is given a sharp tilt to permit air escape and then is held substantially horizontal during its travel through the soaking tank. Also, the basket is tilted as it leaves the soaking tank to facilitate drainage and the swinging movement which it undergoes while passing from the soaking tank to the rinsing chamber insures dislodgment of water around the rolled edges of the pans. As the basket moves upwardly from the rinsing chamber to the drying chamber, it is again tilted for the purpose of dislodging water from behind the rolled edges of the pans and then passes on through the drying chamber in oblique position for the purpose of removing drainage from the pans.

Over the tank 15 is supported a motor 47 which, through suitable gearing, which need not be described in detail, causes simultaneous movement of the chains 20. A second motor operates a fan 48 which withdraws air from the drying chamber, passes such air over heating means (not shown) and returns it by way of the header 49 to the ducts 50 in which are provided the spray nozzles 16. The agitator 12 is driven by a chain from one of the sprockets 19. A pump 51 draws liquid from the tank 15 and supplies the same through the pipes 52 to the spray nozzles 13.

The operator inserts a pan to be washed into the baskets through the aperture 18. The baskets then traverse two passages of the tank 11, where they are thoroughly soaked in the solution therein contained, such solution being continuously agitated by the agitator 12. During the entire movement through the tank 11, the pans are in inverted position. The pans are then passed, still in inverted position between the sprays 13 through which clear water from the tank 15 is supplied to the pans. The liquid dripping from the pans is collected by the partition 14 and drained back into the tank 15. After the rinsing operation, the pans, still in inverted position, are passed through the drying chamber where they are subjected to jets of hot air. The pans then in washed and dried condition are delivered to the aperture 18, where they are removed and replaced with pans to be washed. During their entire travel through the machine, the pans are maintained in inverted position to facilitate soaking, drainage and drying. In the tanks 11 and 15 are provided means for heating the liquid contained in such tanks to a desired temperature.

In the upper left-hand end of the casing is provided a vent 52 for the escape of steam rising from the tank 11 or entering through the jets 13. The partition 17, in combination with the partition 53 directs steam toward the vent 52, thus preventing the clean and dry pans from being contacted with such steam. A vent 54 is also provided for the escape of steam from the left-hand end of the tank 11.

I claim:

1. A pan washing machine comprising a casing having a single opening for insertion and removal of pans, a soaking tank in said casing, a horizontally arranged rinsing means above said tank, a horizontally arranged drying means above said rinsing means, partitions between said tank and rinsing means and between said rinsing means and drying means, an endless conveyor passing from said opening twice through said tank at different levels in superposed relation, said rinsing means, said drying means and back to said opening, reticulate baskets pivotally attached to said conveyor at points below their center of gravity and in which said pans are arranged in inverted position, and co-operating means on said basket and casing wall for rotating said baskets relative to said conveyor to maintain said pans in inverted position during the passage thereof through said tank, rinsing means and drying means.

2. A pan washing machine comprising a casing having a single opening for insertion and removal of pans, a soaking tank in said casing, a horizontally arranged rinsing means above said tank, a horizontally arranged drying means above said rinsing means, partitions between said tank and rinsing means and between said rinsing means and drying means, an endless conveyor passing from said opening twice through said tank at different levels in superposed relation, said rinsing means, said drying means and back to said opening, reticulate baskets pivotally attached to said conveyor at points below their centers of gravity and in which said pans are arranged in inverted position, and co-operating means on said basket and casing wall for controlling the position of the baskets relative to the direction of chain travel during passage of the baskets through the conveyor cycle.

3. A pan washing machine comprising a casing having a single opening for insertion and removal of pans, a soaking tank in said casing, a horizontally arranged rinsing means above said tank, a horizontally arranged drying means above said rinsing means, partitions between said tank and rinsing means and between said rinsing means and drying means, an endless conveyor passing from said opening twice through said tank at different levels in superposed relation, said rinsing means, said drying means and back to said opening, reticulate baskets pivotally attached to said conveyor at points below their center of gravity and in which said pans are arranged in inverted position. and co-operating means on said basket and casing wall for tilting said baskets during introduction thereof into the tank to arrange the pans in substantially vertical position and for controlling the position of the baskets relative to the direction of chain travel during the passage of the baskets through the remainder of the conveyor cycle.

4. A pan washing machine comprising a casing having a single opening for insertion and removal of pans, a soaking tank in said casing, a first pair of horizontally extending spray members above said tank having provision for projecting liquid toward each other, a second pair of horizontally extending spray members in said casing above said first pair and having provision for projecting air toward each other, partitions between said tank and said first pair of spray members and between said first and second pairs of spray members, an endless conveyor passing from said opening twice through said tank at different levels in a superposed relation, the spray members of said first pair, the spray members of said second pair and back to said opening, reticulate baskets pivotally attached to said conveyor at points below their center of gravity and in which said pans are arranged in inverted position, and co-operating means on said baskets and casing wall for controlling the position of the baskets relative to the direction of chain travel during passage of the baskets through the conveyor cycle.

5. A pan washing machine comprising a casing having a single opening for insertion and removal of pans, a soaking tank in said casing, a first pair of horizontally extending spray members above said tank having provision for projecting liquid toward each other, a second pair of horizontally extending spray members in said casing above said first pair and having provision for projecting air toward each other, partitions between said tank and said first pair of spray members and between said first and second pairs of spray members, an endless conveyor passing from said opening twice through said tank at different levels in a superposed relation, the spray members of said first pair, the spray members of said second pair and back to said opening, reticulate baskets pivotally attached to said conveyor at points below their center of gravity and in which said pans are arranged in inverted position, and co-operating means for tilting the baskets during their introduction into the tank to arrange the pans therein substantially in vertical position and for controlling the position of the baskets relative to the direction of chain travel during the passage of the baskets through the remainder of the conveyor cycle.

6. A pan washing machine according to claim 4 characterized by a partition and a vent in said casing so arranged as to protect the dried pans from contact by steam arising from said soaking tank.

7. A pan washing machine comprising a casing having a single opening for insertion and removal of pans, pan-soaking means in said casing, rinsing means above said soaking means, drying means above said rinsing means, partitions between said soaking means and rinsing means and between said rinsing means and drying means, an endless conveyor passing from said opening successively through said soaking means, rinsing means and drying means, reticulate baskets pivotally attached to said conveyor, and co-operating means on said baskets and casing wall for controlling the position of the baskets relative to the direction of chain travel during passage of the baskets through the conveyor cycle.

8. A pan washing machine comprising a casing having a single opening for insertion and removal of pans, a soaking tank in said casing, a horizontally arranged rinsing means above said tank, a horizontally arranged drying means above said rinsing means, partitions between said tank and rinsing means and between said rinsing means and drying means, an endless conveyor passing from said opening through said tank, said rinsing means, said drying means and back to said opening, reticulate baskets pivotally attached to said conveyor in which said pans are arranged in inverted position, and co-operating means on said basket and casing wall for rotating said baskets relative to said conveyor to maintain said pans in inverted position during the passage thereof through said tank rinsing means and drying means.

9. A pan washing machine comprising a casing having a single opening for insertion and removal of pans, a soaking tank in said casing, a horizontally arranged rinsing means above said tank, a horizontally arranged drying means above said rinsing means, partitions between said tank and rinsing means and between said rinsing means and drying means, an endless conveyor passing from said opening through said tank, said rinsing means, said drying means and back to said opening, reticulate baskets pivotally attached to said conveyor in which said pans are arranged in inverted position, and co-operating means on said basket and casing wall for controlling the position of the baskets relative to the direction of chain travel during passage of the baskets through the conveyor cycle.

10. A pan washing machine comprising a casing having a single opening for insertion and removal of pans, a soaking tank in said casing, a horizontally arranged rinsing means above said tank, a horizontally arranged drying means above said rinsing means, partitions between said tank and rinsing means and between said rinsing means and drying means, an endless conveyor passing from said opening through said tank, said rinsing means, said drying means and back to said opening, reticulate baskets pivotally attached to said conveyor in which said pans are arranged in inverted position, and co-operating means on said basket and casing wall for tilting said baskets during introduction thereof into the tank to arrange the pans in substantially vertical position and for controlling the position of the baskets relative to the direction of chain travel during the passage of the baskets through the remainder of the conveyor cycle.

11. A pan washing machine comprising a casing having a single opening for insertion and removal of pans, a soaking tank in said casing, a first pair of horizontally extending spray members above said tank having provision for projecting liquid toward each other, a second pair of horizontally extending spray members in said casing above said first pair and having provision for projecting air toward each other, partitions between said tank and said first pair of spray members and between said first and second pairs of spray members, an endless conveyor passing from said opening through said tank, the spray members of said first pair, the spray members of said second pair and back to said opening, reticulate baskets pivotally attached to said conveyor in which said pans are arranged in inverted position, and co-operating means on said baskets and casing wall for controlling the position of the baskets relative to the direction of chain travel during passage of the baskets through the conveyor cycle.

12. A pan washing machine comprising a casing having a single opening for insertion and removal of pans, a soaking tank in said casing, a first pair of horizontally extending spray members above said tank having provision for projecting liquid toward each other, a second pair of horizontally extending spray members in said casing above said first pair and having provision for projecting air toward each other, partitions between said tank and said first pair of spray members and between said first and second pairs of spray members, an endless conveyor passing from said opening through said tank, the spray members of said first pair, the spray members of said second pair and back to said opening, reticulate baskets pivotally attached to said conveyor in which said pans are arranged in inverted position, and co-operating means for tilting the baskets during their introduction into the tank to arrange the pans therein substantially in vertical position and for controlling the position of the baskets relative to the direction of chain travel during the passage of the baskets through the remainder of the conveyor cycle.

13. A pan washing machine according to claim 11 characterized by a partition and a vent in said casing so arranged as to protect the dried pans from contact by steam arising from said soaking tank.

HAROLD H. BALL.